March 20, 1951 G. B. WATKINS 2,545,907
MULTIPLE GLAZING UNIT WITH LIGHT MODIFYING SCREEN
Filed July 16, 1949 2 Sheets-Sheet 1

Inventor
George B. Watkins
By Nobbe & Swope
Attorneys

March 20, 1951     G. B. WATKINS     2,545,907

MULTIPLE GLAZING UNIT WITH LIGHT MODIFYING SCREEN

Filed July 16, 1949     2 Sheets-Sheet 2

Inventor
George B. Watkins
By Nobbe & Swope
Attorneys

Patented Mar. 20, 1951

2,545,907

UNITED STATES PATENT OFFICE 2,545,907

MULTIPLE GLAZING UNIT WITH LIGHT MODIFYING SCREEN

George B. Watkins, Toledo, Ohio, assignor to Libbey-Owens-Ford Glass Company, Toledo, Ohio, a corporation of Ohio Application July 16, 1949, Serial No. 105,218

6 Claims. (Cl. 20—56.5)

1

The present invention relates broadly to multiple glass sheet glazing units and more particularly to an improved unit of this type provided with means for controlling the entry of light and to the method of fabricating said unit.

Properly made, double glazing units make it feasible to install large glass areas in homes and buildings without incurring substantial additional heat loss. One type of house, for example, is designed on a principle whereby the structure is so oriented with respect to the sun that solar radiation is effectively used to heat or assist in heating the dwelling. These are commonly termed solar houses. To prevent excessive sunlight during certain periods of the year or times of the day, it is customary to provide means for regulating the amount of sunlight permitted to enter the building. This is ordinarily done by roof overhangs, awnings, canopies, and such devices, or by placement of shrubbery or trees.

There are many types of glass installations such as in transoms, rear windows of automobiles, large windows and wall areas in general, where an abundance of natural daylight or a wide range of vision is desired but which, if provided, introduces the problem of excessive light or glare at certain periods of the day and year.

The primary object of this invention is to provide a multiple glass sheet glazing unit provided with a built-in light controlling or screening device or member which is permanently mounted between the glass sheets. Preferably, the completed unit is composed entirely of glass and metal so that it will have a long life of usefulness and not be subject to deterioration such as may be expected when organic materials are used and exposed to normal temperature, humidity, and other conditions.

Generally stated, the glazing unit herein provided is made up of two or more sheets of glass arranged in spaced face to face relation with one another and maintained in this position by metal spacer or separator means secured to adjacent faces of the glass sheets around their marginal portions to create a permanently sealed space therebetween containing properly conditioned air. In accordance with the invention, a screening member, preferably of metal, is mounted within the space between the glass sheets and is carried by the metal separator means. The screening member is maintained under tension to prevent sagging or buckling thereof and is so designed and constructed that substantial light is permitted to pass through the glazing unit in a controlled manner while objectionable direct light is

2 prevented from passing therethrough. At the same time, good vision through the unit is permitted so that the advantages of a transparent opening are retained but unwanted excessive light is prevented or overcome. In other words, the glazing unit of this invention is transparent to a high degree but prevents the passage of glaring overhead light rays such as sunlight. Thus, the unit will permit the passage of light and has the property of visibility but will prevent the passage therethrough of sunlight rays which are glaring and sun heat rays when the sun is overhead.

Other objects and advantages of the invention will become more apparent during the course of the following description, when taken in connection with the accompanying drawings.

In the drawings, wherein like numerals are employed to designate like parts throughout the same:

Figures 1, 2, 3, 4:
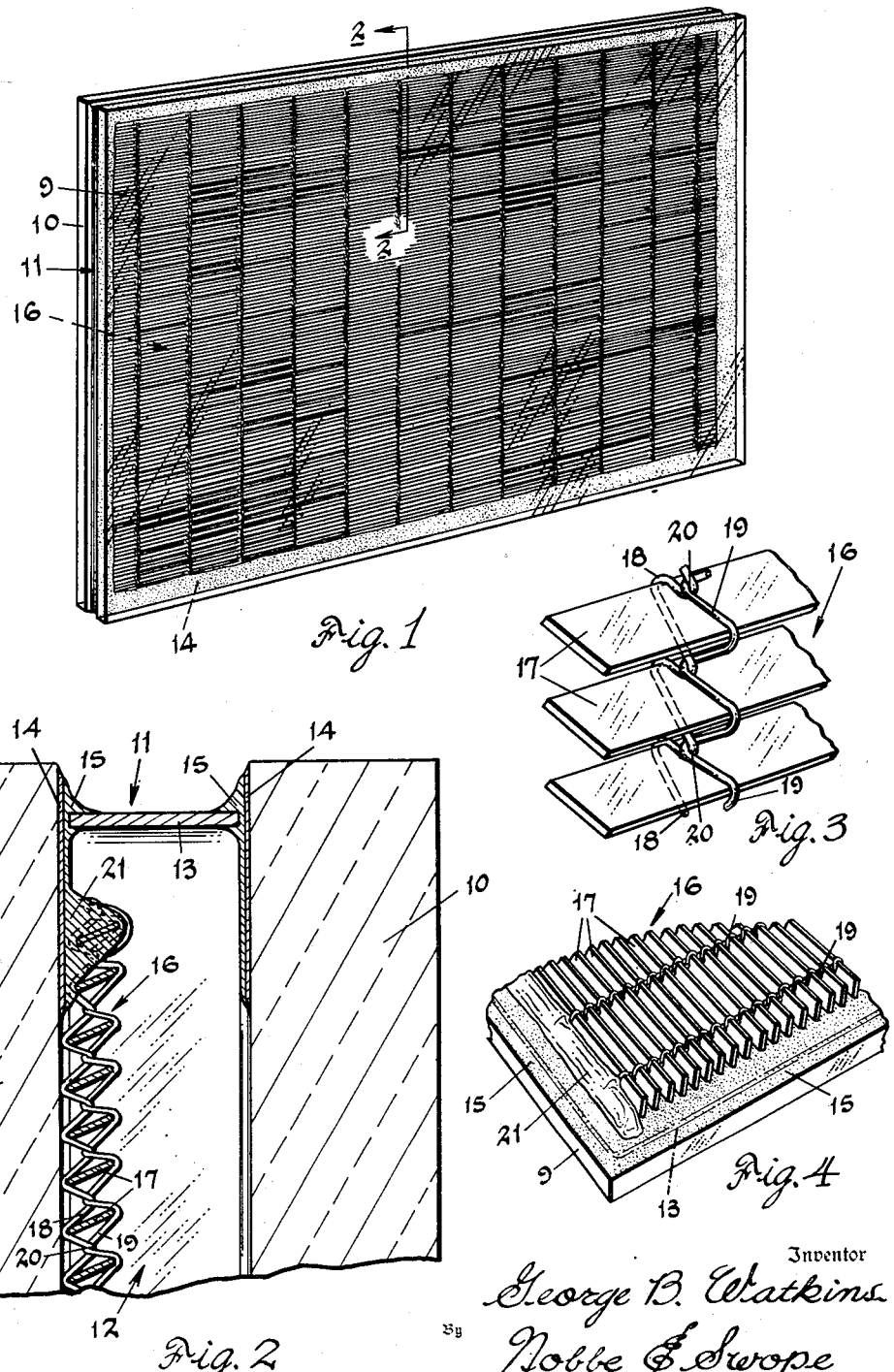
Fig. 1 is a perspective view of a multiple glazing unit constructed in accordance with the invention and including one form of self-contained screening member.
Fig. 2 is an enlarged sectional view through one edge of the unit taken substantially on line 2—2 of Fig. 1.
Fig. 3 is an enlarged fragmentary perspective view of a portion of the screening member.
Fig. 4 is a perspective view illustrating the manner in which the screening member is secured to one of the glass sheets.

The multiple glazing unit illustrated in Fig. 1 is rectangular in shape and indicates a type of unit which may be used for a variety of purposes, including the glazing of a window of a building, but it should be remembered that the units can be made to any desired size and/or shape. Such unit is composed of two sheets of glass 9 and 10 arranged in spaced face to face relation to each other and maintained in this position by a metal separator means 11 to provide a hermetically sealed air space 12 therebetween. The separator means 11 may consist of a lead type or equivalent 13 and is permanently secured to the opposed faces of the glass sheets inwardly of their edges through the intermediary of the metallic coatings 14, deposited on and tightly adherent to the marginal portions of the glass sheets, and a tight solder joint 15 between the metallic coatings 14 and the spacer strip 13. The glass sheets 9 and 10 may be of ordinary plate or window glass of the desired thickness or can be a glass having special characteristics such as heat-strengthened glass, tinted glass, ultra-violet transmitting or absorbing glass, etc. When producing such a unit, it must be made to final size and shape as it cannot be altered after fabrication without risk of damage.

In practice, the glass sheets are cut to size, necessary edge work done, and those surfaces which will be inwardly of the assembly are cleaned. The metallic coatings 14 are then applied to one surface of each of the glass sheets as illustrated in Fig. 2, completely around the marginal portions thereof. One practical coating and method of applying it is to use a copper alloy wire having a composition substantially—titanium 1.75 to 2.25 percent, chromium .25 to .75 percent, and the balance copper—which may be sprayed upon the glass by means of a metallizing gun. After the metallic coatings have been applied, the inner surfaces of the glass sheets are given a final cleaning and inspection. The metal spacer is then secured to the metallic coatings by the soldered joint 15. The resulting separator comprises the combination of the metallic coatings 14 on the glass sheets, metal spacer 13 and solder 15, forming an all metal structural member which is approximately H-shape in cross section.

After the glass sheets have been associated with the separator means, the spacer 13 is punctured with a needle in at least two places so that clean dry air may be passed through the space 12 between the sheets to remove moisture and to make it possible to leave clean dry air sealed within the unit. For ordinary purposes, the pressure of the air sealed within the unit is at normal atmospheric pressure, but the air or inert gases may be sealed in at, above or below normal atmospheric pressure. The needle openings are soldered closed promptly after the needles have been withdrawn. This type of all-glass-metal glazing unit will withstand the normal conditions of use and the metal separator firmly adhered to the glass sheets prevents leakage or diffusion of moisture into the space therebetween.

In carrying out the present invention and during fabrication of the unit, a light screening member or device, indicated in its entirety by the numeral 16, is permanently mounted between the glass sheets. This screening member may be of a conventional type which has been produced for use in openings of buildings and similar places which effectively prevents glaring sun rays and glaring overhead light rays from entering through these openings or it may be of any preferred construction. The screening member 16 herein shown may be likened to a Venetian blind except that the horizontal strips or louvers are of a fixed angle to the vertical plane of the window, whereas the usual Venetian blind has these strips or louvers adjustable.

With reference particularly to Figure 3, the screen 16 consists essentially of a plurality of definitely spaced filler wires 17 of elongated or ribbon-like cross section positioned with their longitudinal sides parallel to each other and disposed at an angle to the plane of the screen. These filler wires constitute horizontal slats or louvers, each of which is tilted to an angle with respect to the vertical plane of the window and to the horizontal plane normal to the vertical plane through the window. The slats or louvers 17 are effectively locked in this position by a plurality of pairs of supporting wires 18 and 19, the two wires of each pair passing alternately over and under successive slats 17. The wires 18 and 19 of each pair are also twisted together to form integrating twists 20 between successive slats.

The angle at which the slats 17 are arranged can of course be varied to suit particular conditions, but it has been found that a very satisfactory unit is one in which the horizontal flat wires or slats have a width of approximately $\frac{3}{32}$ of an inch and are set at an angle of seventeen degrees with the horizontal, with the measurement between the flat wires being equivalent to 18 mesh. The supporting wires 18 and 19 are relatively fine and of sufficient strength to properly maintain the slats in adjusted alignment. When this type of screening member is used, it is placed within the glazing unit so that the slats will be horizontal when the unit is in use. The angle of inclination of the slats may be varied by experiment to the most effective point, depending upon what position the sun or other light source has with respect to the window or to the opening to be shaded and to the amount of clear or transparent space desired.

In fabricating the glazing unit, the screen 16 is secured to one of the glass sheets before the sheets are assembled with the separator 11. More specifically, the supporting wires 18 and 19 are soldered at their opposite ends to the metallic coatings 14 on one of the glass sheets as indicated at 21. Separated drops of solder can be used to secure the pairs of wires 18 and 19 to the metallic coatings on the glass sheet, or a continuous layer of solder can be run across the entire width of the glass sheet as shown in Fig. 4. When mentioning soldering, it is assumed that the screening material is a metal which can be soldered. If other types of materials are used, appropriate cementing or bonding means must likewise be selected.

It has been found that in double glazing units of this type, there is a tendency for the metal screen 16 to sag or buckle when the unit is installed in a window opening. Such a condition is highly objectionable since it impairs the usefulness of the unit as well as detracting from its appearance. Thus, such sagging will throw the slats 17 out of alignment with one another resulting in wider spaces between them at certain points and narrower spaces at other points. More important is the fact that such sagging will change the angle of the slats or louvers. Further, sagging of the screen cannot be corrected after the unit has been fabricated without completely disassembling it. To avoid this condition, there is herein provided a novel method which consists generally in stretching the supporting wires 18 and 19 to place the screen 16 under tension during the soldering thereof to the glass sheet. By placing the screen under tension, sagging or buckling thereof will be eliminated and, as a consequence, the appearance and utility of the unit greatly enhanced.

Figure 7:
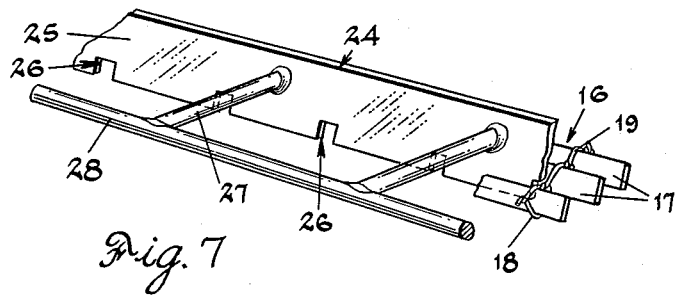
Fig. 7 is a perspective view of a portion of the means for holding the screening member under tension during the securing thereof.
Figure 5:
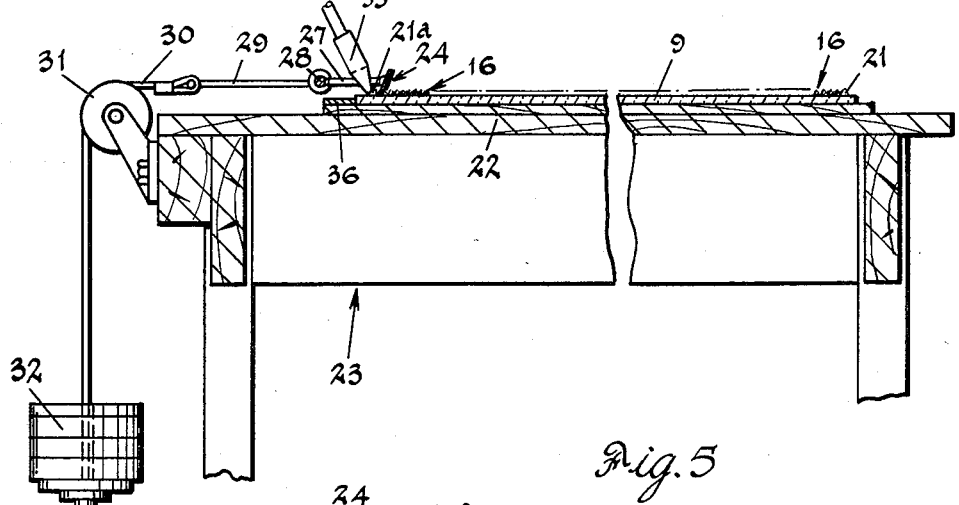
Fig. 5 is a longitudinal sectional view through one form of apparatus which may be used in the method herein provided for securing the screening member to the glass sheet.
Figures 6, 8:
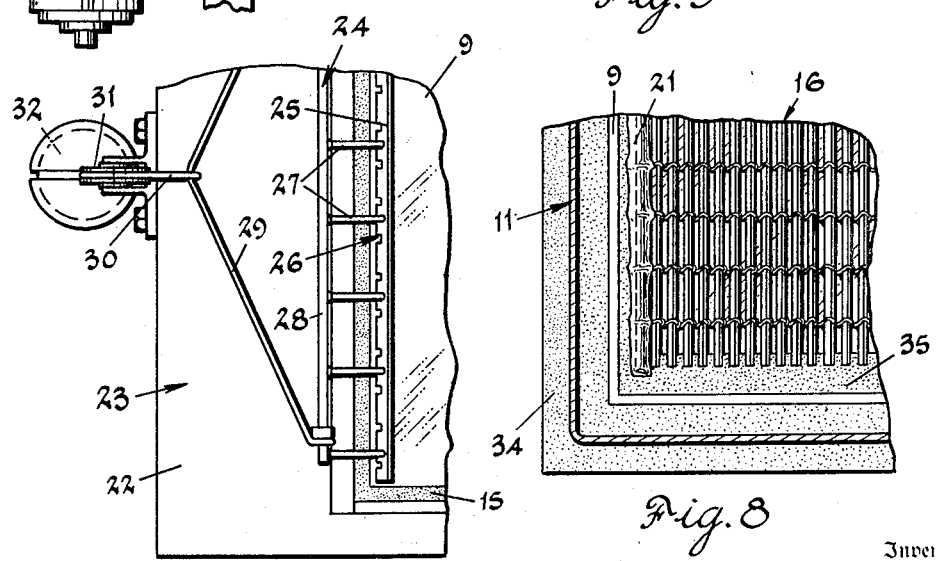
Fig. 6 is a plan view of a portion of the apparatus.
Fig. 8 is a plan view of a slightly modified form of glazing unit.

With reference particularly to Figs. 5, 6 and 7, the glass sheet 9 to which the screen 16 is to be attached is laid horizontally upon the top 22 of a table 23, with the metallic coating 14 facing upwardly. One end of the glass sheet is placed against a suitable stop 36. The screen 16 is then placed on the glass sheet and the supporting wires 18 and 19 soldered, at the ends thereof opposite stop 36, to the metallic coating 14 on the glass sheet, as indicated at 21 in Fig. 5. After this has been done, the opposite end of the screen is engaged by a suitable stretching device 24 which may consist of a so-called comb in the form of a flat strip 25 of suitable material provided in one edge with a series of notches 26 spaced to correspond to and which hook over the pairs of holding wires 18 and 19 between two adjacent slats 17 as shown in Fig. 7. Carried by the strip 25 are a plurality of substantially horizontal parallel arms 27 secured at their outer ends to a common transverse rod 28. Connected to the opposite ends of the rod is a bail 29 to which is fastened a cable 30 running over a pulley 31 mounted upon the table and carrying at its outer end adjustable weights 32.

Since the screen has been previously secured at its opposite end to the glass sheet, the weight 32 will effect a predetermined stretching of the pairs of wires 18 and 19 to place the screen under a desired tension. While the screen is thus held under tension, the free ends of the wires 18 and 19 are soldered to the metallic coating 14 on the glass sheet, as indicated at 21a in Fig. 5, by means of a hand soldering iron 33, after which the comb 24 is removed and any excess of screen trimmed off. In this way the screen is not only placed under tension during the securing thereof to the glass sheet, but will remain under tension after the comb has been removed. The effect of this tension is to prevent or minimize the liability of sagging or buckling of the screen when the unit is placed in use so that the slats 17 will be uniformly maintained parallel with one another and at their predetermined angle. In some instances, it may be found desirable to also secure the wires 18 and 19 to the glass sheet at spaced points between their ends by drops of solder.

While the vertical tension applied to the screen may vary, depending upon the size of unit, it must be sufficient to hold the screen securely in a good taut plane. By way of example, the vertical wires 18 and 19 may be stretched between .050 inch and .125 inch per foot of height. This, in turn, requires from three quarters to two pounds per pair of wires 18 and 19, and since these wires occur every one-half inch from one and one-half to four pounds per horizontal inch of screen. The tension applied will be from nine to twenty-four pounds per foot width of screen.

Although normally a Venetian blind is adjustable, its principle of light control is well understood, so for purposes of explanation the particular screening member 16 herein illustrated may be referred to as a fixed opening Venetian blind. It permits substantial passage of light and likewise enables an observer to see through the opening but is effective in reducing glare and excessive direct light. For example, if the slats 17 are arranged at an angle of seventeen degrees to the horizontal, sun rays will be prevented from passing through the window if the sun has risen to an angle of approximately forty degrees to the horizontal. Thus, the sun's rays are effectively kept from entering through the screened opening when the sun is passing through its arc and directing its hottest rays toward the earth.

The type of double glazing unit described herein and without the screening member gives protection against two kinds of heat transfer, namely, conduction and convection. The addition of a screening member of the character disclosed and built into the unit provides a safeguard against passage of excessive solar radiation through the window during that period of the year or time of day when it is not desired. In the summer months when the sun is "high," the slats act as a barrier to a substantial part of the radiant energy by reflecting it back to the outside of the window. When the sun is "lower" as in winter months, substantially all of its radiation will pass between the slats and into the interior of the building which is as desired. Thus, the size and arrangement of the slats can be controlled at time of manufacture to give a nice balance between winter and summer solar radiation conditions for any given location.

After the screening member 16 has been attached to the glass sheet 9, this sheet is assembled with the glass sheet 10 and separator means 11 in the manner described above. As shown in Fig. 2, the metallic coatings 14 on the glass sheets are made relatively wide, particularly at the top and bottom of the unit, so that the screen can be attached thereto without placing any strain on the solder joint 15 between the metallic coatings and metal spacer 13 which might tend to disrupt the slat. Thus, it will be seen that the layer of solder 21 securing the screen to the glass sheet is spaced from the solder joint 15. Another advantage in forming the metallic coatings 14 of the same width on both sheets of glass is that when the unit is mounted in place, the metallic coatings, being opaque, will serve to hide the solder connection 21 between the metal screen and metallic coatings when viewed from either side of the unit, thereby giving the unit a much neater appearance. A further advantage of the unit herein provided is that it is hermetically sealed which serves to keep the screen free from dirt and dust as well as guarding it against injury.

In Fig. 8 is illustrated a slightly modified arrangement which may be employed and in which the solder connection between the screen and glass sheet is entirely separated from the solder joint between the glass sheet and separator. As shown, the glass sheet is provided with a metallic coating 34 similar to the coating 14 above described and to which the metal separator 11 is secured. However, there is applied to the glass sheet, inwardly of and spaced from the coating 34, a separate metallic coating 35 to which the metal screen 16 is soldered as also above described. By completely separating the metallic coatings 34 and 35, no strain whatever can be applied to the seal between the glass and separator means.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A multiple glass sheet glazing unit, comprising two spaced parallel sheets of glass, a metal separator lying between the marginal portions of the glass sheets and firmly adherent thereto, and a light screening member fixed within the space between the glass sheets and made up of a plurality of flat slats extending in one direction and a series of spaced wires extending in a different direction for holding said slats in place, said screening member being under unidirectional tension in the direction of said wires and secured to one of said glass sheets.

2. A multiple glass sheet glazing unit, comprising two spaced parallel sheets of glass, a metal separator lying between the marginal portions of the glass sheets and firmly adherent thereto, and a metallic light screening member fixed within the space between the glass sheets and made up of a plurality of flat slats extending in one direction and a series of spaced wires extending in a different direction for holding said slats in place, said screening member being under unidirectional tension in the direction of said wires and permanently soldered at two opposite ends to one of said glass sheets.

3. A multiple glass sheet glazing unit, comprising two spaced parallel sheets of glass, a metal separator lying between the marginal portions of the glass sheets and firmly adherent thereto, a light screening member fixed within the space between the glass sheets and made up of a plurality of horizontally arranged flat slats and a series of spaced vertical wires for holding said slats in place, said screening member being maintained under vertical tension in the plane of the screen, and means for permanently securing the screening member to one of the glass sheets, said securing means being spaced from the metal separator.

4. A multiple glass sheet glazing unit, comprising two spaced parallel sheets of glass, metallic coatings arranged around the marginal portions of the opposed surfaces of said glass sheets and firmly adherent thereto, a metal separator lying between the glass sheets and secured to said metallic coatings, a metallic light modifying screen arranged in the space between the glass sheets and made up of a plurality of horizontally arranged flat metal slats and a series of spaced vertical wires for holding said slats in place, and means for securing the opposite ends of the vertical wires to the metallic coating on one of the glass sheets, with the said wires being maintained under tension to prevent buckling of the screen when the unit is installed.

5. A multiple glass sheet glazing unit, comprising two spaced parallel sheets of glass, metallic coatings arranged around the marginal portions of the opposed surfaces of said glass sheets and firmly adherent thereto, a metal separator lying between the glass sheets and secured to said metallic coatings, a metallic light modifying screen arranged in the space between the glass sheets and made up of a plurality of horizontally arranged flat metal slats and a series of spaced vertical wires for holding said slats in place, and a soldered connection for securing the opposite ends of the vertical wires to the metallic coating on one of the glass sheets, with the said wires being maintained under tension to prevent buckling of the screen when the unit is installed, said soldered connection being spaced from the metal separator.

6. A multiple glass sheet glazing unit, comprising two spaced parallel sheets of glass, metallic coatings arranged around the marginal portions of the opposed surfaces of said glass sheets and firmly adherent thereto, a metal separator lying between the glass sheets and secured to said metallic coatings, a metallic light modifying screen arranged in the space between the glass sheets and made up of a plurality of horizontally arranged flat metal slats and a series of spaced vertical wires for holding said slats in place, and a soldered connection for securing the opposite ends of the vertical wires to the metallic coating on one of the glass sheets, with the said wires being maintained under tension to prevent buckling of the screen when the unit is installed, said soldered connection being spaced from the metal separator and the metallic coatings on the glass sheets being of sufficient width to cover said soldered connection when the unit is viewed from either side.

GEORGE B. WATKINS.

REFERENCES CITED

The following references are of record in the file of this patent:

UNITED STATES PATENTS

| Number | Name | Date |
|---|---|---|
| 620,293 | Fleming | Feb. 28, 1899 |
| 1,860,232 | Carpenter | May 24, 1932 |
| 1,915,398 | Bedell et al. | June 27, 1933 |
| 2,235,681 | Haven et al. | Mar. 18, 1941 |
| 2,264,161 | Hammer | Nov. 25, 1941 |
| 2,281,071 | Knudsen | Apr. 28, 1942 |
| 2,382,566 | Heckman | Aug. 14, 1945 |